(12) United States Patent
Jorgensen

(10) Patent No.: US 6,981,524 B2
(45) Date of Patent: Jan. 3, 2006

(54) TWIST OFF DRIVE FOR A TUBE PLUG

(75) Inventor: Glenn F. Jorgensen, Ridgewood, NJ (US)

(73) Assignee: JNT Technical Services, Inc., Little Ferry, NJ (US)

( * ) Notice: Subject to any disclaimer, the term of this patent is extended or adjusted under 35 U.S.C. 154(b) by 100 days.

(21) Appl. No.: 10/723,666

(22) Filed: Nov. 26, 2003

(65) Prior Publication Data

US 2005/0109413 A1    May 26, 2005

(51) Int. Cl.
*F16L 55/00* (2006.01)

(52) U.S. Cl. .................. 138/89; 138/97; 220/234; 29/523

(58) Field of Classification Search .............. 138/89, 138/90, 97, 93; 29/522.1, 523; 220/234
See application file for complete search history.

(56) References Cited

U.S. PATENT DOCUMENTS

| | | | | |
|---|---|---|---|---|
| 3,525,365 A | * | 8/1970 | Boyle et al. .................. | 138/89 |
| 4,091,841 A | * | 5/1978 | Beneker et al. .............. | 138/89 |
| 4,393,564 A | * | 7/1983 | Martin .................. | 29/890.031 |
| 4,425,943 A | * | 1/1984 | Martin ........................ | 138/89 |
| 4,653,540 A | * | 3/1987 | Epstein ........................ | 138/89 |
| 4,982,763 A | * | 1/1991 | Klahn ........................ | 138/89 |
| 5,042,679 A | * | 8/1991 | Crowson et al. ......... | 220/259.3 |
| 5,194,214 A | * | 3/1993 | Snyder et al. .............. | 376/203 |
| 5,249,604 A | * | 10/1993 | Keating ........................ | 138/89 |
| 5,289,851 A | * | 3/1994 | Jorgensen .................... | 138/89 |
| 5,437,310 A | * | 8/1995 | Cunningham ................ | 138/89 |
| 5,456,290 A | * | 10/1995 | Haberman et al. ............ | 138/89 |
| 5,560,394 A | * | 10/1996 | Jorgensen .................... | 138/89 |
| 6,511,341 B1 | * | 1/2003 | Finona et al. ................ | 439/475 |
| 6,883,547 B1 | * | 4/2005 | Jorgensen .................... | 138/89 |

* cited by examiner

*Primary Examiner*—Patrick Brinson
(74) *Attorney, Agent, or Firm*—Sonnenschein Nath & Rosenthal LLP

(57) ABSTRACT

A tube plug kit including a tube plug having a housing member and a locking member, the housing member having a smooth longitudinal bore communicating with a threaded portion, the locking member mounted on the housing member. An insert member having a first threaded end portion is received within the threaded portion of the bore, an enlarged portion positioned to be drawn within the smooth portion of the longitudinal bore in response to rotation of the insert member in the longitudinal bore and a drive portion configured to receive a torque applying tool in a rotationally driving manner. A torque limiting region is located in the insert member to limit an amount of torque the drive portion can transmit to the first threaded end portion.

21 Claims, 2 Drawing Sheets

TWIST OFF DRIVE FOR A TUBE PLUG

BACKGROUND OF THE INVENTION

The present invention relates to improvements for a plug used to form a seal for tubes, pipes and similar conduits which transport steam, liquid or gases under pressure.

An earlier version of this type of plug commercially exploited by the present Applicant is disclosed in U.S. Pat. Nos. 4,653,540, 5,289,851 and 5,560,394, the specifications of which are hereby incorporated by reference. The plug disclosed in U.S. Pat. No. 4,653,540 comprises a hollow housing member which has at one end a relatively large open bore surrounded by a thin wall, and a relatively smaller threaded bore which communicates with the larger bore. An insert member is provided which, in use, is threaded into the smaller bore thereby causing a tapered member, which may be formed on the insert member, to engage the open end of the large bore causing it to expand and bear against the wall of a heat exchanger tube into which the heat exchanger tube plug has been inserted.

During use, the housing member is prevented from rotating relative to the heat exchanger tube by means of an eccentric assembly which is mounted on the end of the housing member. At the other end, the insert member has a cylindrical portion and a centrally disposed, integrally formed nut portion. The nut is proportioned and shaped to be grasped by a wrench for screwing the insert member into the housing member. The nut must be turned with a specific torque in order to assure a tight seal between the insert member and the tube. If excessive torque is applied, then the tube being sealed might be split, the threaded connection might strip or the drive surface could be damaged. The disclosure also suggests that instead of the projecting nut portion, a hexagonal recess may be formed in the end of the cylindrical portion for insertion of a hex wrench or similar tool.

Early on during manufacture of the plug defined in U.S. Pat. No. 4,653,540, the plugs had a machined male hex that would accommodate a $^{11}/_{32}$ inch socket. This, however, proved unsatisfactory because the sockets split and could not be turned down to a diameter in order to fit in any tube smaller than ½ inch. This would be necessary when the plug is recessed within the end of a tube to be sealed. The next design evolution entailed broaching a ¼ inch female square drive in plugs from 460 inches to 0.610 inches in diameter and a ⅜ inch square drive in all plugs 0.620 inches and larger.

U.S. Pat. No. 5,289,851 describes a tube plug that can be provided in dimensions down to 0.420 inches, yet which permits installation torque values of up to 700 inch pounds. In this improved plug, the insert member as disclosed in U.S. Pat. No. 4,653,540, has been replaced with a T45 Torx® socket head screw combined with a separately machined cone having an internal passage threaded to match the threads of the screw. A T45 Torx® drive can be torqued to 764 inch pounds before failure which permits a recommended installation value of up to 700 inch pounds to be utilized. It also allows over torquing to occur.

In both U.S. Pat. Nos. 4,653,540 and 5,289,851 a tool is required to engage the insert member, and specifically, the recess portion or nut of the insert member, in order to screw the insert member into the housing member. Typically, the insert member includes a recess, such as a T45 Torx® socket head recess or a hexagon socket head recess, to engage the tool. However, such an arrangement creates a fair amount of slippage which can complicate the process of screwing the insert member into the housing member, especially in light of the high torsional forces that are being used. Thus, in order to reduce slippage between the tool and the recess of the insert member, an adhesive, such as a drive holding compound, may be applied to the recess or the end of the tool that engages the recess. Also, a specific amount of torque must be applied to the insert member which requires a special tool for measuring torque, which is sometimes difficult to use, particularly in situations where the portion of the tube to be sealed is in a somewhat inaccessible location, or where the lighting is poor.

It would therefore be an improvement in this art if a tube plug having an insert member were provided with a drive system that did not require a separate tool for measuring or applying a desired torque.

SUMMARY OF THE INVENTION

In one aspect of the invention, a tube plug kit is provided comprising a tube plug having a housing member and a locking member, the housing member having a longitudinal bore comprising a smooth portion communicating with a threaded portion, the locking member being mounted on the housing member. An insert member having a first threaded end portion is received within the threaded portion of the bore. An enlarged portion of the insert member is positioned to be drawn within the smooth portion of the longitudinal bore in response to rotation of the insert member in the longitudinal bore. A drive portion on the insert is configured to receive a torque applying tool in a rotationally driving manner. Also, a torque limiting region is located in the insert member to limit an amount of torque the drive portion can transmit to the first threaded end portion.

The torque limiting region could comprise a weakened portion such as by providing a portion of the insert with a reduced diameter or a frangible joint between the first threaded end portion and the drive portion.

In another aspect of the invention, a drive system is provided for an insert member to be threadingly engaged with a tube plug, the drive system comprising an insert member having a first threaded end portion to be received within the tube plug and a drive portion configured to receive a torque applying tool in a rotationally driving manner. The system also includes a torque limiting region located in the insert member to limit an amount of torque the drive portion can transmit to the first threaded end portion.

In a specific embodiment of the invention, a tube plug kit is provided comprising a tube plug having a housing member and a locking member. The housing member has a longitudinal bore comprising a smooth portion communicating with a threaded portion, and the locking member is mounted on the housing member. An insert member is provided having a first threaded end portion received within the threaded portion of the bore, an enlarged portion positioned to be drawn within the smooth portion of the longitudinal bore in response to rotation of the insert member in the longitudinal bore and a cylindrical, extending drive portion comprising an externally threaded region to receive a torque applying tool in a rotationally driving manner. A torque limiting region comprising a reduced diameter portion is located in the insert member to limit an amount of torque the drive portion can transmit to the first threaded end portion.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
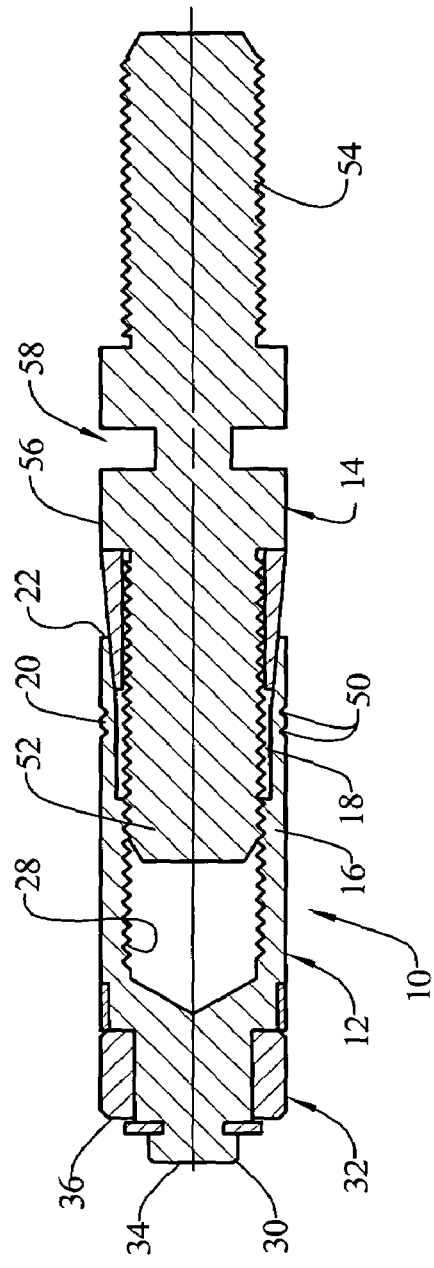
FIG. 1 is a cross sectional view of a heat exchanger tube plug made in accordance with the present invention, in accordance with one embodiment.
Figure 2:
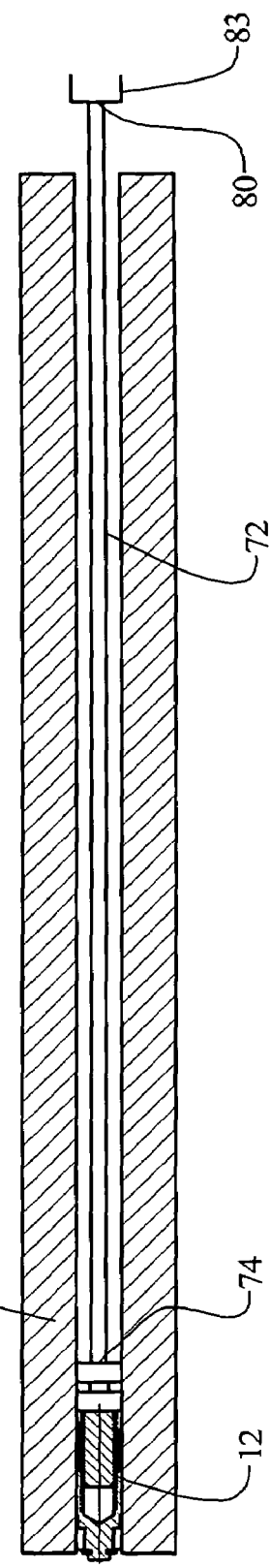
FIG. 2 is a cross sectional view of the apparatus of FIG. 1, being inserted into a recessed location.

In FIG. 1 a boiler tube plug 10 is shown which is made in accordance with the present invention. The plug 10 comprises a hollow housing member 12 and an insert member 14. The housing member 12 has a cylindrical body 16, the rear portion of which is formed with a large open bore 18. The bore 18 is surrounded by relatively thin wall 20, the end portion 22 of which will expand outwardly to provide a seal for a boiler tube 24 as is shown in FIG. 2, when the insert member 14 is screwed into the housing member 12. The housing member 12 also includes a relatively smaller internally threaded cylindrical bore 28 which communicates with the large bore 18.

At its front end 30, the housing member 12 is provided with a locking member 32 which serves to lock the housing member tightly within the boiler tube 24, as is shown in FIG. 2, so that the insert member 14 can be screwed into the housing member 12. In one embodiment, the locking member 32 includes an eccentric assembly that comprises a cylindrical post 34 which projects axially from the front end 30 of the housing member 12, a ring member 36 which is mounted eccentrically on the post and is rotatable thereon. A description of such a tube plug can be found in U.S. Pat. Nos. 5,560,394; 5,289,851; and 4,653,540, the disclosures of which are incorporated herein by reference.

The outer surface of the housing member 12 includes a plurality of annular grooves 50 adjacent to the open bore 18 of the housing member to enhance the sealing characteristics of the plug as described below.

Figure 3:
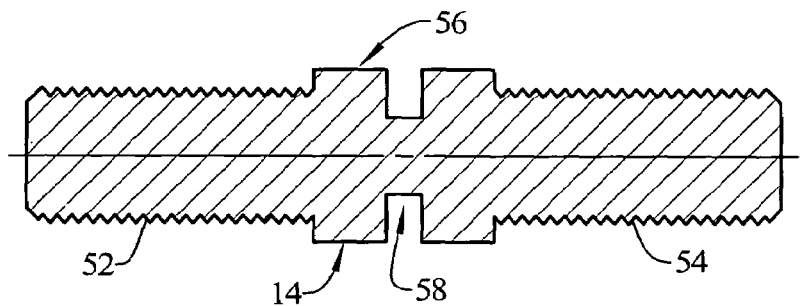
FIG. 3 is an isolated elevated side view of the insert of FIG. 1, in accordance with one embodiment.

The insert member 14, in the embodiment shown in FIGS. 1–3 is comprised of a first threaded end 52 and an enlarged substantially cylindrical extension 56 having a second threaded end 54. In this embodiment, the first threaded end 52 is inserted into the housing member and the second threaded end 54 receives an internally threaded tool (shown in FIG. 4) which drivingly engages with the second end to turn the insert member 14 by applying a torque to the insert member.

In the embodiment shown in FIGS. 1–3, the cylindrical extension 56 is provided with a torque limiting portion 58 in the form of a reduced diameter area which is designed to withstand only a prescribed torque before it shears off. The diameter and material of the reduced diameter portion is chosen to transmit up to the torque desired for insertion of the insert member 14 into the tube plug 10 by the correct amount. Excessive torque cannot be applied in that the reduced diameter portion, which comprises a torque limiting portion, will fail, and further transmission of torque will be terminated.

Figure 4:
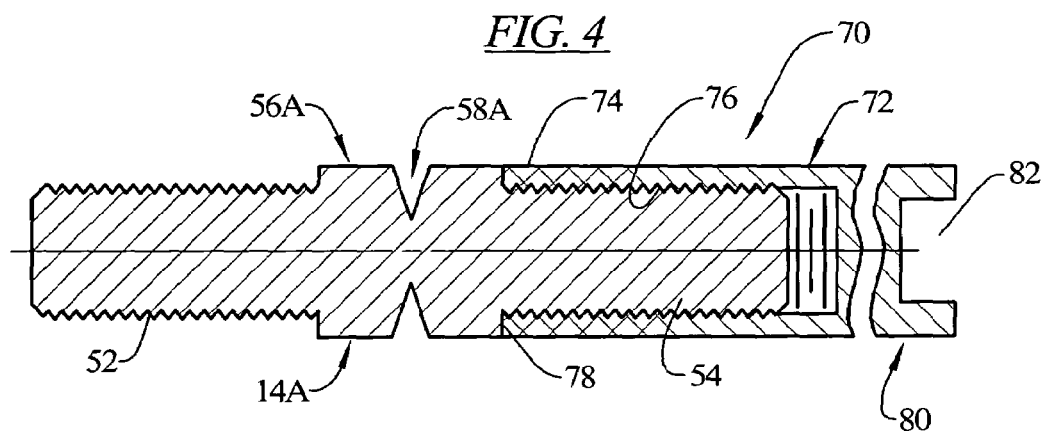
FIG. 4 is an isolated elevated side view of the insert of FIG. 1, in accordance with another embodiment, along with a driving tool.

The insert member 14A, in the embodiment shown in FIG. 4, differs in the manner in which the torque limiting portion 58A is constructed. In this embodiment, the torque limiting portion 58A is formed by a reduced diameter portion which is achieved by a narrowing of the diameter in the cylindrical extension 56A, but there is not an abrupt radial decrease in the diameter. Rather, the diameter decreases gradually to a smallest diameter. Again, the diameter and material of the reduced diameter portion 58A is chosen to transmit up to the torque desired for insertion of the insert member 14 into the tube plug 10 by the correct amount. Excessive torque cannot be applied in that the reduced diameter portion, which comprises a torque limiting portion, will fail, and further transmission of torque will be terminated.

A torque applying tool 70 is shown in FIG. 4 which can be used with the insert members 14 shown in FIGS. 1–5. This tool 70 can comprise a rod 72 with a first end 74 that has a drive surface 76 in the form of a tapped bore sized to threadingly receive the second threaded end 54 of the insert member 14A. The tool 70 can be threaded onto the second end 54 of the insert 14A until the first end 74 of the rod 72 engages a shoulder 78 on the cylindrical extension 56A. Alternatively, the tapped bore 76 might be shorter in length than the second threaded end 54, so that the second threaded end will bottom out in the bore. In either event, once the tool 70 is fully threaded onto the insert 14A, the rod 72 will transmit torque to the insert. The tool 70 is provided at its second end 80 with a drive surface 82 for engagement by a powered or manual tool 83 (FIG. 2) as is well known for applying rotational torque. For example, the drive surface 82 could be a female square drive, other internal or recessed drive surfaces such as a hexagonal shape, a rectangular shape, a star shape, or other well known shapes used in driving tools. Other arrangements, such as a shaping of an outer surface of the second end 80 of the rod 72 could also be used to provide a drive surface for the rod.

When a tool in the form of a rod 72 is used to drive the insert 14, the use of the tube plug 10 is enabled, for example, in a heat exchanger tube bundle where the plug is to be inserted at a distal position, such as the far tube sheet, without removing the far head. Insertion of a tube plug 10 in such a relatively inaccessible location is shown in FIG. 2.

Figure 5:
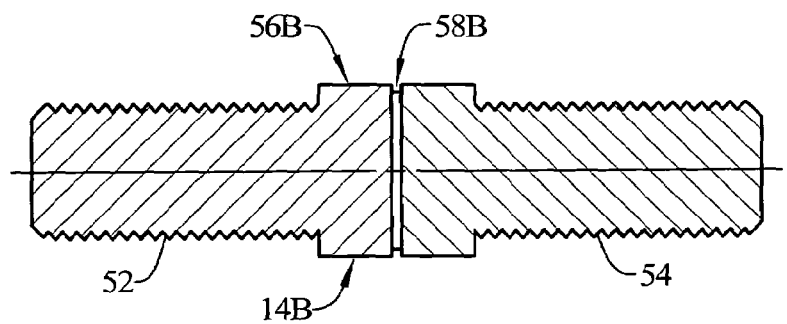
FIG. 5 is an isolated elevated side view of the insert of FIG. 1, in accordance with another embodiment.

The insert member 14B, in the embodiment shown in FIG. 5, differs in the manner in which the torque limiting portion 58B is constructed. In this embodiment, the torque limiting portion 58B is formed by a joint in the cylindrical extension 56B, but there is no decrease in the diameter. Rather, the joint 58B is formed in such a way as to fail upon a predetermined level of torque being applied to it. The joint may be an adhesion such as welding, soldering, glue or similar adhering mechanisms. Excessive torque cannot be applied to the insert 14B in that the joint 58B, which comprises a torque limiting portion, will fail, and further transmission of torque will be terminated.

Figure 6:
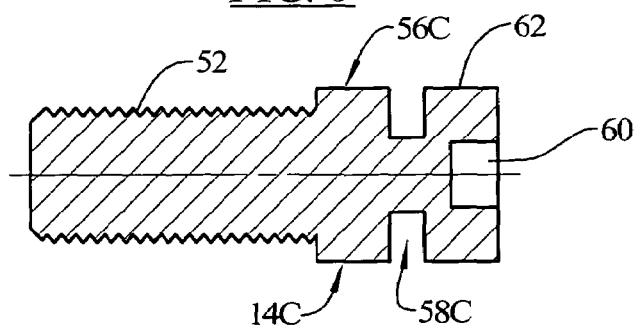
FIG. 6 is an isolated elevated side view of the insert of FIG. 1, in accordance with another embodiment.

The insert member 14C, in the embodiment shown in FIG. 6 is comprised of a first threaded end 52, but no second threaded end. Instead of external threading formed on the exterior of a portion of the cylindrical extension 56C, a tool receiving recess 60 is formed in an end of the extension disposed away from the first threaded end 52. Such recess could be a square shape, a hexagonal shape, a rectangular shape, a star shape, or other well known shapes used in driving tools. Other arrangements, such as a shaping of an outer diameter of the cylindrical extension 56C could also be used to provide a drive surface for the extension. Again, a torque limiting portion 58C (of any of the types previously described) is provided in the extension 56C to limit the amount of torque that is transmitted to the first threaded end 52 of the insert 14.

In each of the embodiments, the insert 14 with a torque limiting portion 58 will eliminate the use of a torque wrench during installation of the tube plug 10. The described drive system with the torque limiting portion 58 will enable a mechanic to "torque to failure" thereby transmitting the correct amount of torque to the tube plug 10. The use of a rod type tool 70 allows for installation of the tube plug 14 in inaccessible locations, saving enormous amounts of time and costs that would otherwise result from the downtime of a apparatus, such as a nuclear reactor which relies on the use of heat exchanger tubes that may need to be sealed with a tube plug.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

What is claimed is:

1. A tube plug kit comprising:
    a tube plug having a housing member and a locking member, the housing member having a longitudinal bore comprising a smooth portion communicating with a threaded portion, the locking member mounted on the housing member;
    an insert member having a first threaded end portion received within the threaded portion of the bore, an enlarged portion positioned to be drawn within the smooth portion of the longitudinal bore in response to rotation of the insert member in the longitudinal bore and a drive portion configured to receive a torque applying tool in a rotationally driving manner; and
    a torque limiting region located between said enlarged portion and said drive portion in said insert member to limit an amount of torque said drive portion can transmit to said first threaded end portion.

2. A tube plug kit according to claim 1, wherein said drive portion comprises a substantially cylindrical extension formed on said insert member.

3. A tube plug kit according to claim 2, wherein said drive portion comprises a threaded region on said cylindrical extension to receive said torque applying tool.

4. A tube plug kit according to claim 3, wherein said threaded region is applied to an outer surface of said cylindrical extension.

5. A tube plug kit according to claim 2, wherein said drive portion comprises a recess for receiving said torque applying tool.

6. A tube plug kit according to claim 2, wherein said cylindrical extension comprises a portion with a reduced diameter forming said torque limiting region.

7. A tube plug kit according to claim 2, wherein said cylindrical extension comprises a weakened portion forming said torque limiting region.

8. A tube plug kit according to claim 1, wherein said first threaded end portion and said drive portion are joined together at a joint, and said joint comprises said torque limiting region.

9. A tube plug kit according to claim 1, further including a driving tool for engaging with said drive portion.

10. A tube plug kit according to claim 9, wherein said driving tool comprises a rod having a torque transmitting drive surface at a first end to engage with said drive portion of said insert member and a drive surface at a second end for engagement by a torque applying tool.

11. A tube plug kit comprising:
    a tube plug having a housing member and a locking member, the housing member having a longitudinal bore comprising a smooth portion communicating with a threaded portion, the locking member mounted on the housing member;
    an insert member having a first threaded end portion received within the threaded portion of the bore, an enlarged portion positioned to be drawn within the smooth portion of the longitudinal bore in response to rotation of the insert member in the longitudinal bore and a cylindrical, extending drive portion comprising an externally threaded region to receive a torque applying tool in a rotationally driving manner; and
    a torque limiting region comprising a reduced diameter portion located in said insert member to limit an amount of torque said drive portion can transmit to said first threaded end portion.

12. A tube plug kit according to claim 11, further including a driving tool comprising a rod having a torque transmitting drive surface at a first end to engage with said drive portion of said insert member and a drive surface at a second end for engagement by a torque applying tool.

13. A drive system for an insert member to be threadingly engaged with a tube plug comprising:
    an insert member having a first threaded end portion to be received within the tube plug and a drive portion configured to receive a torque applying tool in a rotationally driving manner;
    said drive portion comprising an extension formed on said insert member with a threaded region on said extension to receive said torque applying tool; and
    a torque limiting region located in said insert member to limit an amount of torque said drive portion can transmit to said first threaded end portion.

14. A drive system according to claim 13, wherein said extension is substantially cylindrical.

15. A drive system according to claim 13, wherein said threaded region is applied to an outer surface of said extension.

16. A drive system for an insert member to be threadingly engaged with a tube plug comprising:
    an insert member having a first threaded end portion to be received within the tube plug and a drive portion configured to receive a torque applying tool in a rotationally driving manner;
    a torque limiting region located in said insert member to limit an amount of torque said drive portion can transmit to said first threaded end portion;
    said first threaded end portion and said drive portion being joined together at a joint, and said joint comprising said torque limiting region.

17. A drive system according to claim 16, wherein said drive portion comprises a threaded region.

18. A drive system according to claim 17, wherein said threaded region is applied to an outer surface of said drive portion.

19. A drive system according to claim 16, wherein said drive portion comprises a recess.

20. A drive system according to claim 16, further including a driving tool for engaging with said drive portion.

21. A drive system according to claim 20, wherein said driving tool comprises a rod having a torque transmitting drive surface at a first end to engage with said drive portion of said insert member and a drive surface at a second end for engagement by a torque applying tool.

* * * * *